H. F. BECHMAN.
INK FOUNTAIN FOR PRINTING PRESSES.
APPLICATION FILED OCT. 12, 1911.
1,142,659.
Patented June 8, 1915.
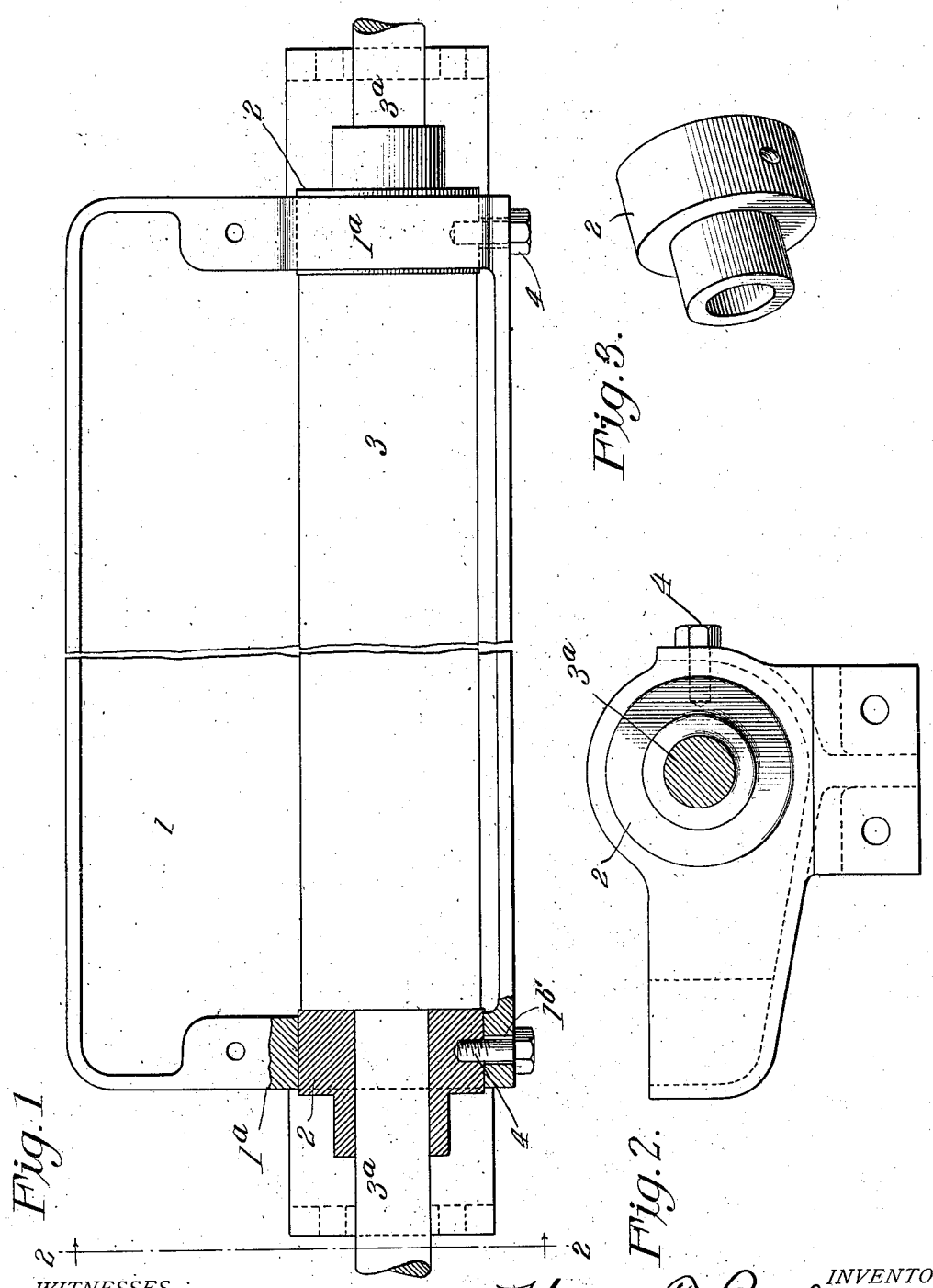

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN, A CORPORATION OF MICHIGAN.

INK-FOUNTAIN FOR PRINTING-PRESSES.

1,142,659.  Specification of Letters Patent.  Patented June 8, 1915.

Application filed October 12, 1911. Serial No. 654,289.

*To all whom it may concern:*

Be it known that I, HENRY F. BECHMAN, of Battle Creek, in the county of Calhoun and State of Michigan, have invented certain new and useful Improvements in Ink-Fountains for Printing-Presses; and I hereby declare that the following is a full, clear, and exact description thereof, reference being had to the accompanying drawings, which form part of this specification.

This invention is a novel improvement in the construction of ink fountains for printing presses, and its objects are to insure the exact axial alinement of the bearings of the fountain roll in the fountain; to enable such bearings to be turned and faced apart from the fountain casting, and then positioned therein; and to insure a close true fit between the inner ends of the bearings and the adjacent ends of the fountain roll to prevent any leakage or waste of ink from the fountain around the bearings at the end of the roll.

Another important object of the invention is economy of manufacture. Fountains made in this manner cost much less to build and assemble, besides being much more perfect and satisfactory in construction.

I will explain the invention with reference to the accompanying drawings which illustrate one practical embodiment thereof.

In said drawings Figure 1 is a top plan view of a portion of an inking fountain showing the fountain casting, the fountain roll and its journal bearings, one of the bearings being shown in section. Fig. 2 is an end elevation of Fig. 1. Fig. 3 is a detail perspective view of one of the bearings detached.

1 designates the approximately trough shaped fountain body or casting, which may be of any desired usual construction, having thickened end walls 1ª in which the fountain roll journal bearings are mounted. The end walls 1ª of said fountain are preferably bored out to form openings or pockets for the journal bearings and when these pockets are circular they should be slightly larger in diameter than the diameter of the fountain roll 3. Such pockets can be bored simultaneously in a suitable machine so that the two pockets will be in exact axial alinement. The pockets when circular should be slightly larger in diameter than the fountain roll 3, so that the latter can be readily inserted in position in the fountain by passing it endwise through the said pockets.

The fountain roll is provided with trunnions or journals 3ª at its ends, and after said roll has been placed in position in the fountain, the journal bearings 2, which are suitably bored to fit the trunnions 3ª, can be slipped endwise over the latter. Said journal bearings are adapted to closely fit in the pockets in the end walls 1ª. After the bearings have been slipped on the fountain roll journals (when the pockets and bearings are circular) the bearings can be pressed endwise into the pockets in the fountain end-walls; and when so positioned the fountain roll will be correctly positioned in the fountain, and the bearings be truly axially alined.

The journal bearings 2 can be machined prior to their insertion in the fountain ends; and the inner ends of said bearings should be plane-surfaced, so that they will fit accurately and closely against the ends of the fountain roll 3.

With the old method of mounting the rolls in the fountains the ends of the roll would be more or less out of square with the inner surface of the fountain end-walls and therefore in a short time ink would work between the ends of the fountain roll and the fountain walls and thence out through the bearings. And as the surfaces became worn this would increase and considerable annoyance would be caused, and there was no means for remedying this condition. Such leakage is entirely eliminated by my method of mounting the fountain rolls.

In order to secure the bearings in position I prefer to form threaded sockets in one side of each bearing for engagement by tap bolts 4, which are passed through holes 1ᵇ in the end walls 1ª and screwed into such threaded sockets. The holes 1ᵇ, in the fountain walls, through which these tap bolts pass, are preferably made slightly larger in diameter than the bolts to enable the journal bearings to be adjusted endwise in the pockets for the purpose of taking up the end motion on the fountain roll when it becomes slightly worn. By tapping the bolts 4 into the journal bearings, to clamp the latter to the fountain, I obviate the danger of cracking or breaking the fountain end-walls, which set screws tapped through the walls might do.

The advantages of this invention are,— economy of construction; facility of finishing the parts of the fountain; simplicity of assemblage thereof; accuracy of fit; ready compensation for wear; and economy in repairs. These advantages of the invention might be obtained in other embodiments of the invention than that herein illustrated which however I prefer because when the pockets are simultaneously formed, by a proper machine, in the end-walls they are in perfect alinement, one with another, and consequently the bearings for the fountain roll will be truly alined when they are placed in these pockets.

What I claim is:

1. In combination with an ink fountain having axially alined openings in its end walls slightly larger in diameter than the fountain roll; a fountain roll adapted to be inserted through said openings into the fountain; journal bearings for the roll adapted to be slipped endwise over the journals of the roll and forced endwise into the said openings; and setting bolts passed through holes in the end-walls and screwed into threaded sockets in the adjacent bearings to secure the latter in position.

2. In combination with an ink fountain having axially alined pockets in its end-walls of greater diameter than the roll, a fountain roll, and journal bearings for the roll of larger diameter than the roll and corresponding to the pockets and adapted to be slipped endwise over the journals of the roll and fitted into the said pockets; and setting bolts passed through holes in the end-walls and screwed into threaded sockets in the adjacent bearings to secure the latter in position.

3. In an ink fountain the combination of a fountain body having axially alined circular openings in its end-walls of larger diameter than the fountain roll; a fountain roll adapted to be inserted endwise through either opening; removable journal bearings for the roll having parts corresponding in external contour to the internal contour of the said openings and adapted to be slipped endwise over the journals of the roll and forced endwise into the said openings to close the same and position the roll in the body, and means for fastening said bearings in said openings.

In testimony that I claim the foregoing as my own, I affix my signature in presence of two witnesses.

HENRY F. BECHMAN.

Witnesses:
IRVING K. STONE,
CHARLES A. GRAMES.